United States Patent [19]

Stürmer

[11] 4,226,724

[45] Oct. 7, 1980

[54] TWO-STAGE PUSHER CENTRIFUGE

[75] Inventor: Fritz G. Stürmer, Mülheim, Fed. Rep. of Germany

[73] Assignee: Siebtechnik GmbH, Mülheim, Fed. Rep. of Germany

[21] Appl. No.: 910,367

[22] Filed: May 30, 1978

Related U.S. Application Data

[63] Continuation of Ser. No. 726,619, Sep. 27, 1976, abandoned.

[30] Foreign Application Priority Data

Sep. 26, 1975 [DE] Fed. Rep. of Germany ....... 2542916

[51] Int. Cl.$^2$ .............................................. B01D 33/10

[52] U.S. Cl. .................................................... 210/376

[58] Field of Search ............ 210/376, 372, 369, 360 R

[56] References Cited

U.S. PATENT DOCUMENTS 2,755,934 7/1956 Rüegg ................................. 210/376

FOREIGN PATENT DOCUMENTS 1030771 5/1958 Fed. Rep. of Germany ........... 210/376
1076573 2/1960 Fed. Rep. of Germany ........... 210/376
1151468 7/1963 Fed. Rep. of Germany ........... 210/376
768825 2/1957 United Kingdom ..................... 210/376

*Primary Examiner*—Frank Sever
*Attorney, Agent, or Firm*—Becker & Becker, Inc.

[57] ABSTRACT

A two-stage pusher centrifuge with a pusher bottom and an axially displaceable cylindrical inner drum which serves as pusher element for a subsequent outer drum which is cylindrical within the pusher region. That cylindrical section of the outer drum which is located in the pusher region is followed by a conically widening section conically widening toward the open drum end.

4 Claims, 1 Drawing Figure

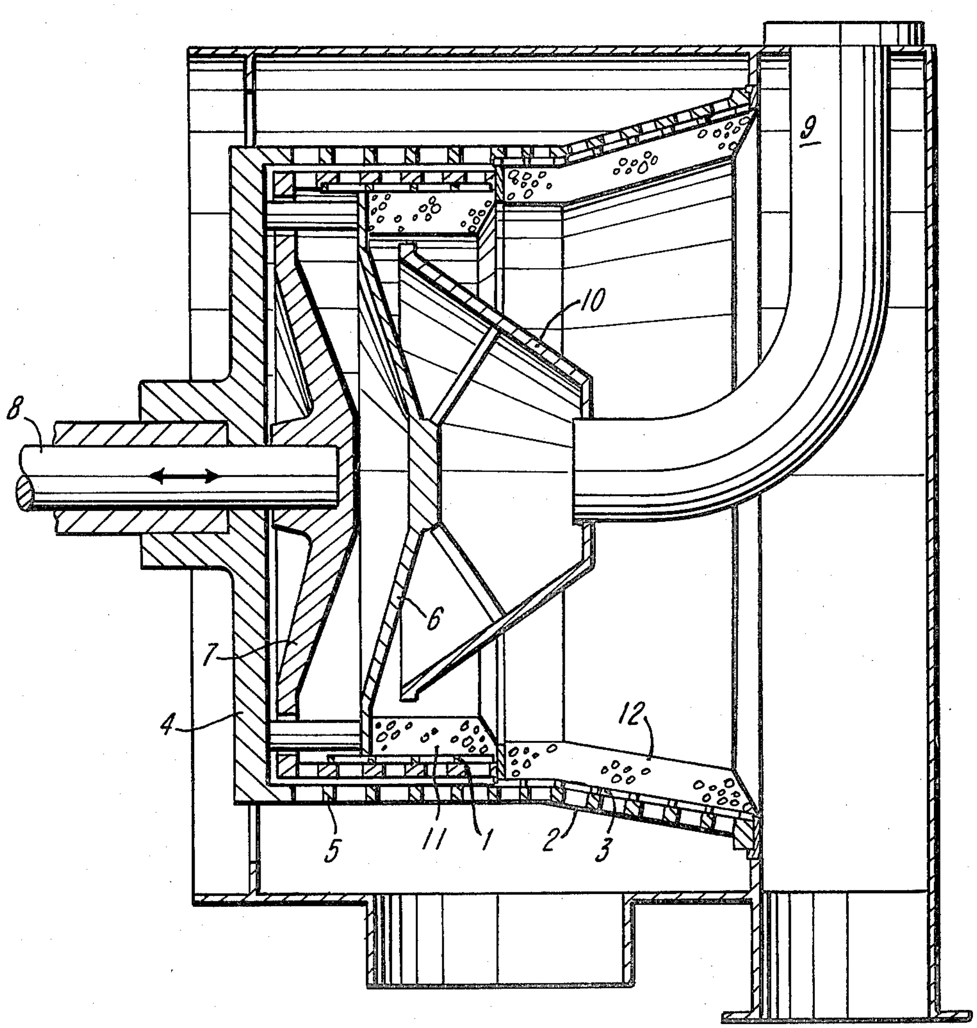
9
10
8
6
7
4
12
5
11
1
2
3

TWO-STAGE PUSHER CENTRIFUGE

This is a continuation of application Ser. No. 726,619-Greiner-Stürmer filed Sept. 27, 1976, now abandoned.

The present invention relates to a two-stage pusher centrifuge with a pusher bottom and an axially displaceable cylindrical inner drum which serves as pusher element for a subsequent outer drum that is cylindrical within the pushing zone.

With heretofore known two-stage pusher centrifuges of the above mentioned type, the two screening drums, which means the inner drum and the outer drum, extend over the entire length in the form of a cylinder. Inasmuch as the thickness of the filter cake being formed in pusher centrifuges depends primarily from the ratio of the inner friction of the filter cake to the outer friction of the filter cake on the screen, and consequently increases about proportionally with the length of the drum, it will be appreciated that the structural length of pusher centrifuges and thus the cake volume, especially for fine granular and/or compressible substances or products with external frictional coefficient, for instance crude phosphate, can be varied only within relatively narrow limits. Therefore, for these "difficult" products, only two-stage pusher centrifuges of conventional design with short drum length are suitable which, however, as a consequence of the small cake volume resulting therefrom have a highly reduced degree of efficiency.

As is well known, with two-stage pusher centrifuges, the first stage, which means the cylindrical inner drum, serves for pre-water withdrawal and cake formation, whereas the second stage, which means the cylindrical outer drum, serves as drying stage.

In view of the frictional conditions in said second stage formed by the cylindrical outer drum, said second stage will thus limit the output with regard to the through-put quantity as well as with regard to the final moisture for the entire pusher centrifuge aside from an increased energy consumption for the translatory drive of the inner drum froming the pusher member for the second stage. With such two-stage pusher centrifuges, the first formed by the axially displaceable inner drum is overdimensioned relative to the second stage with regard to the absorption capacity, withdrawal of water and reliable cake formation even if charging variations occur.

Also the employment of multi-stage (up to eight stages) pusher centrifuges has for many products not proved advantageous inasmuch as with these pusher centrifuges with the same structural size and in particular diameter size of the last drum, the thereby inevitably smaller diameter of the inner drum forming the first stage limits the efficiency. Furthermore, also the relatively complicated construction of such multi-stage centrifuges with the inherent considerably higher purchasing and operational costs has to be taken into consideration. As has already been mentioned, the inner drum diameter determines the admissible charging quantity of the suspension or of the matter to be centrifuged or treated. Furthermore, four and multi-stage pusher centrifuges have become known (for instance by German Auslegeschrift No. 1,030,770) with drum sections for withdrawing water from viscous crystalline matter to be centrifuged which at room temperature solidify, said drum section being always cylindrical in the pushing zone and being followed by conical drum sections. With a pusher centrifuge of this type, it is especially intended to form thin filter layers in order to improve the washing of the crystals. Due to the conicity of the inner drum forming the first stage, no sufficient filter cake formation is assured within the region of this first stage so that a greater proportion of fine particles can pass into the discharge. This conicity of the first stage also brings about a considerable reduction in the drum diameter and in the region in which the suspension to be treated is conveyed to the inner drum whereby, in view of the shorter entrance diameter in the cylindrical portion of the inner drum, the charged quantity and thus the entire through-put of the pusher centrifuge will be reduced. One-stage pusher centrifuges with a cylindrical conical drum have become known. Such one-stage machines are, however, sensitive with regard to variations in the concentration of the charge so that such pusher centrifuges cannot be employed for well filterable and/or non-compressible products. A further disadvantage consists in the poor degree of exploitation of the pusher drive in only one direction.

It is, therefore, an object of the present invention to provide a two-stage pusher centrifuge which is considerably improved over heretofore known pusher centrifuges and with which, on one hand an optimum adaptation of the output of the first stage to the output capability of the second stage and vice versa will be assured in order at uniform separating quality to be able to increase the through-put output.

It is a further object of this invention to provide a two-stage pusher centrifuge as set forth above, in which for purposes of saving energy the machine will be so designed that the pusher centrifuge can be operated at considerably higher discharge output with a lower specific pusher output.

These and other objects and advantages of the invention will appear more clearly from the following specification in connection with the accompanying drawing diagrammatically illustrating in section the region of the screening drum of a two-stage pusher centrifuge according to the present invention. The two-stage pusher centrifuge with a pusher bottom and an axially displaceable cylindrical inner drum which serves as pushing member for a subsequent outer drum which is cylindrical in the pusher region is characterized primarily in that the cylindrical section of the outer drum located in said pusher region is followed by a section which conically widens in the direction toward the open drum end. In view of this feature, the second stage is with regard to its output and the final moisture content adapted to the performance of the first stage whereby the through-put with the same end quality rose to an unexpected extent up to 50%.

The entrance of the conical section of the outer drum is preferably less than the sliding friction angle of the treated centrifuge-wet solid while the length of the outer drum is about from 60 to 70% of the total length of the drum which is determined by the length of the inner drum plus the length of the section of the outer drum.

In such a two-stage centrifuge with the combination according to the present invention, namely the combination of a short first stage with a cylindrical drum having a length equalling about from 30 to 40% of the effective total drum length, with a cylindrical part in the second stage practically confined to the length of the path of the pusher and with a subsequent conical outer drum section, the inclination of which is less than the sliding friction angle of the centrifuge-wet solid, surprisingly high water withdrawing performance is realized at relatively low pusher output approximately uniformly distributed over two directions and with only slight sensitivity relative to the variations in the charge, due to the short first stage. In view of the conicity in the major region of the outer drum, the cake thickness is due to the angle of inclination and in spite of a longer length of the drum kept relatively low, and furthermore the required pushing force is considerably reduced. In view of the size of the screening and filtering surface continuously increasing when passing through the screening drum in a manner known per se, an easing and loosening of the filter cake and of the matter to be centrifuged will occur whereby the flowing-off of the discharge of the interstitial and gross-capillary liquid will be greatly facilitated.

Referring now to the drawing in detail, the two-stage pusher centrifuge according to the invention comprises a cylindrical inner drum 1 which forms the first stage. This inner drum is in the discharge direction followed by a cylindrical section 2 which as to length corresponds to the length of the pushing path. Said section 2 is followed by the conically outwardly widening section 3 of the outer drum 5. Rigidly connected to the bottom 4 of the outer drum 5 is the pusher bottom 6, whereas the drum bottom 7 of the inner drum 1 is connected to the push rod 8. The push rod 8 is adapted for instance by means of a hydraulic drive to be reciprocated in axial direction. The suspension to be separated passes through the inlet pipe 9 and the filling funnel 10 into the first inner drum 1 forming the screening stage. The solid retained by the inner drum 1 will during the return of the inner drum 1 rest on the pusher bottom 6 and thus will be pushed onto the cylindrical section 2 which means the charging zone, of the second stage formed by the outer drum 3. In this way, the solid within the inner drum is compacted into a cake 11 of such thickness that the forces transferrable by the cake cross section will suffice for overcoming the friction of the filter cake 11 on the screen surface of the inner drum 1.

During the pushing movement of the inner drum 1, the solid in the cylindrical section 2 will be compacted to such an extent that the force required for further moving the cake 12 in the conical section 3 can be conveyed. When the inclination of the conical section 3 of the outer drum 5 corresponds for instance to half the sliding friction angle of the centrifuge-wet solid, the thickness of the filter cake 2 can at about twice the length of the conical section 3 relative to the screen region of the inner drum 1 approximately equal the strength of the filter cake 11. The load on the pusher drive will thus in both directions be equal at the first short stage and a very long second stage.

Thus, the present invention creates a two-stage pusher centrifuge, especially for fine granular mass materials and will have an increased expulsion power at low cost in construction of the device and while requiring only a low specific pushing force.

It is, of course to be understood that the present invention is, by no means, limited to the specific showing in in the drawing, but also comprises any modifications within the scope of the appended claims.

What I claim is:

1. A two-stage pusher centrifuge for effectively dewatering and treating moist liquid material being centrifuged so as to provide a substantially drier material having a characteristic sliding friction angle which comprises an outer drum having a pusher bottom provided at the peripheral portion thereof including a first stage and a second stage with an extension comprising a cylindrical screen section collectively forming a short first stage having a length equalling from 30% to 40% of effective total drum length and a conical outwardly flaring screen section in the second stage practically confined to length of the pusher and the subsequent conically outwardly flaring section having an inclination at an entrance of the conical outwardly flaring section being less that said characteristic sliding friction angle of material in centrifugally moist condition being dewatered and treated along the conically outwardly flaring section, an axially displaceable cylindrical inner screen drum having a pusher end formation slidable on the cylindrical screen section of said outer drum, reciprocable means drivingly connected to said inner drum for reciprocating same, said inner screen drum and pusher end formation being dimensional to extend to the outer end of said cylindrical screen section of said outer drum on outward travel of said inner drum, and pusher bottom means inwardly of and fixed relative to said outer drum in axially spaced relationship to said bottom of said outer drum, including a disk formation extending outwardly with the screen section of said inner drum slidable on its periphery, a second disk formation spaced axially from said first disk formation with the peripheries of said disk formations spaced less than the length of the peripheral cylindrical screen section of said inner drum, a supply conduit leading to the space between said disk formations to supply material to be centrifuged to the said peripheral cylindrical screen section of said inner drum, the cylindrical section of said outer drum extending to the end of the travel of said peripheral screen section of said inner drum, said conical section of said outer drum extending axially and radially outwardly from said cylindrical section of the outer drum a distance greater than the length of the path of travel of said inner drum, so that said inner section moves material on said section of said outer drum onto and along said conical section, the movement along said conical section requiring less force to move the material thereon than for a cylindrical section of equal length, said conical section providing more efficient extraction of moist liquid material than a cylindrical section of less length and less mean diameter.

2. A two-stage pusher centrifuge according to claim 1, in which the length of said cylindrical screen section of said outer drum amounts to about from 60% to 70% of the total length of said outer drum, said total length being determined by the sum of total length of said cylindrical screen section and said conical outwardly flaring screen section of said outer drum.

3. A two-stage pusher centrifuge for effectively dewatering and treating moist liquid material being centrifuged so as to provide a substantially drier material having a characteristic sliding friction angle which comprises an outer drum having a pusher bottom provided at the peripheral portion thereof with an extension comprising a cylindrical screen section up to 40% of effective total drum length and a conical outwardly flaring screen section having an inclination at an entrance of the conical outwardly flaring section less than said characteristic sliding friction angle of material in centrifugally moist condition being dewatered and treated along the conically outwardly flaring section, an axially displaceable cylindrical inner drum having a pusher bottom with a peripheral cylindrical screen section coaxial with and arranged within said cylindrical section of said outer drum, said screen section of said inner drum having a pusher end formation slidable on the screen section of said outer drum, reciprocable means drivingly connected to said inner drum for reciprocating same, and pusher bottom means inwardly of and fixed relative to said outer drum in axially spaced relationship to said bottom of said outer drum, including a disk formation extending outwardly with the screen section of said inner drum slidable on its periphery, the inner screen drum being dimensioned to extend to the axially outer end of said outer cylindrical screen at its outward end of travel, the length of the cylindrical section of said outer drum being equal to the path of travel of said pusher end formation of said inner drum, and said conical section extending axially and radially outwardly from said cylindrical section of said outer drum at the end of travel of said pusher end formation, so that said inner section moves material on said section of said outer drum onto and along said conical section, the movement along said conical section requiring less force to move the material thereon than for a cylindrical section of equal length, said conical section providing longer dwell time for solids in the region of said outer drum to effect more efficient extraction of liquid than a cylindrical section of less length and less mean diameter.

4. A two-stage pusher centrifuge having a rotating assembly rotated by a rotating shaft for effectively dewatering and treating moist liquid material being centrifuged so as to provide a substantially drier material having a characteristic sliding friction angle which comprises a radially outer cylindrical screen formed with a conical screen extension flaring outwardly from the outer end of said outer cylindrical screen, a radially inner cylindrical screen within and coaxial with said outer cylindrical screen and of less length than said outer cylindrical screen, said inner cylindrical screen having its axially outer end formed as a reciprocating pusher element slidable on the inner surface of said outer cylindrical screen, a second pusher element fixed relative to said outer cylindrical screen and having its periphery slidable on the inner surface of said inner cylindrical screen, means to reciprocate said inner screen with its reciprocating pusher element so that said pusher element moves along said outer cylindrical screen from its axially inward position to its outward position, said inner screen and said reciprocating pusher element being dimensioned to extend to the axially outer end of said outer cylindrical screen at its outward end of travel, with its pusher element at the axially outer end of the outer cylindrical screen adjacent said conical extension to push material from said outer cylindrical screen onto said conical extension, said second pusher element retaining material on said inner screen against inward movement when said inner screen returns to its inward position, thereby transferring material from said inner cylindrical screen to said outer cylindrical screen, and assembly including means to deliver material to said inner cylindrical screen, the material on said conical screen extension having a longer dwell time therewith to effect more efficient certrifugal extraction of liquid before being moved off the outer end of said conical extension by outward movement of said inner pusher element to move material from said outer cylindrical screen to said conical screen extension, said rotating conical screen extension creating an outward component of force to assist in moving the material on said screen in an outward direction.

* * * * *

UNITED STATES PATENT AND TRADEMARK OFFICE

CERTIFICATE OF CORRECTION

PATENT NO. : 4,226,724

DATED : October 7, 1980

INVENTOR(S) : Fritz Greiner-Stürmer

It is certified that error appears in the above—identified patent and that said Letters Patent is hereby corrected as shown below:

[75] Inventor: Fritz Greiner-Stürmer, Mülheim, Fed. Rep. of Germany

Signed and Sealed this

*Twenty-third* Day of *December 1980*

[SEAL]

*Attest:*

SIDNEY A. DIAMOND

*Attesting Officer*

*Commissioner of Patents and Trademarks*